United States Patent [19]
Glasson et al.

[11] 3,935,386
[45] Jan. 27, 1976

[54] APPARATUS FOR SYNTHESIZING PHASE-MODULATED CARRIER WAVE

[75] Inventors: Jerry Marshall Glasson, Skokie; Harold Louis Kabb, Glenview, both of Ill.

[73] Assignee: Teletype Corporation, Skokie, Ill.

[22] Filed: Sept. 20, 1974

[21] Appl. No.: 508,021

[52] U.S. Cl. .................. 178/67; 235/154; 325/163
[51] Int. Cl.² ................................... H04L 27/20
[58] Field of Search ........ 178/66 R, 67; 235/92 CC, 235/92 CM; 332/16; 235/154; 340/172.5, 347 DA; 343/17.2 PC; 325/30, 163

[56] References Cited
UNITED STATES PATENTS

| | | | |
|---|---|---|---|
| 3,485,949 | 12/1969 | Haas | 178/67 |
| 3,597,599 | 8/1971 | Melvin | 235/154 |
| 3,818,135 | 6/1974 | Tannhauser | 178/67 |
| 3,867,574 | 2/1975 | McIntosh | 178/67 |

*Primary Examiner*—Benedict V. Safourek
*Attorney, Agent, or Firm*—G. D. Green; D. L. Hurewitz; J. L. Landis

[57] ABSTRACT

Digital logic apparatus for synthesizing a phase-modulated carrier wave wherein phase shifts between successive carrier-wave segments encode data elements. Carrier-wave segments having different phases are stored in the form of digitally encoded samples in a memory. A digital-to-analog converter is connected to convert sequentially read samples of selected segments into the phase-modulated carrier wave. A combinational logic circuit selects each segment to be addressed according to an applied data element and the phase of the previously selected segment. Means are provided to overlap and blend successively addressed segments to provide smooth phase transitions in the synthesized wave.

28 Claims, 10 Drawing Figures

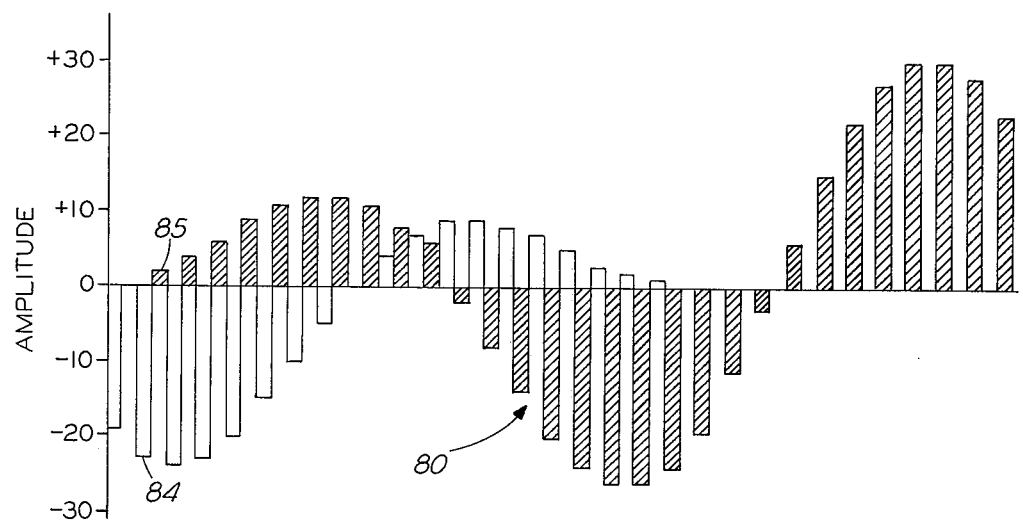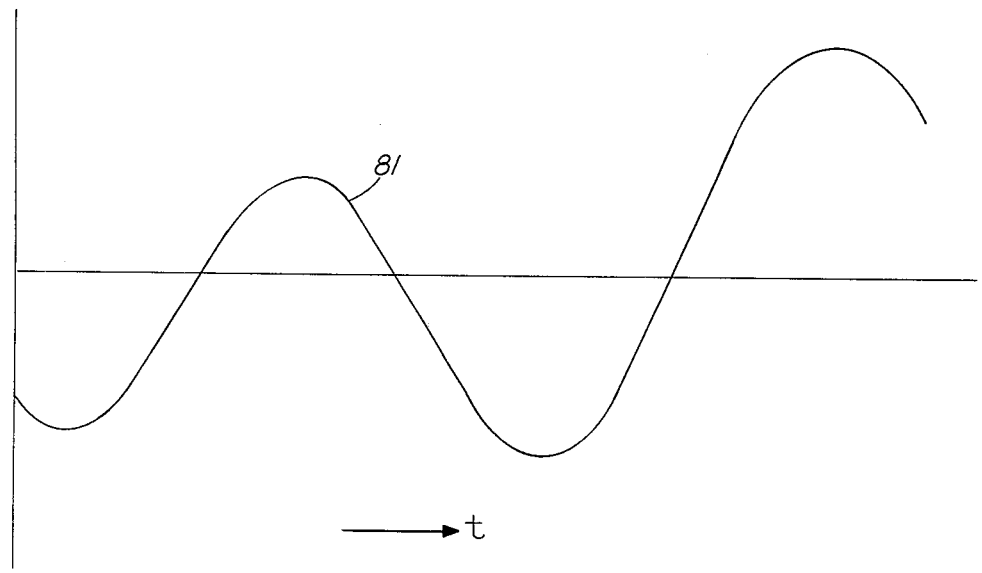
FIG.-4

APPARATUS FOR SYNTHESIZING PHASE-MODULATED CARRIER WAVE

BACKGROUND OF THE INVENTION

1. Field of the Invention

This invention relates to modulators, and more specifically to digital modulators for synthesizing phase-modulated carrier waves.

2. Description of the Prior Art

Apparatus that transmits digital data over communications channels by means of phase modulation techniques is well known in the art. For example, a transmitter for generating a phase-modulated carrier wave according to applied digital data is disclosed in U.S. Pat. No. 3,128,342 issued to P. A. Baker on Apr. 7, 1964. This transmitter comprises both digital and analog circuit elements. Specific analog elements disclosed are filters, envelope modulators, and summing amplifiers.

It is known to represent complex analog waves by a series of digitally encoded samples, for example, as in a pulse-code-modulation telephone system. It is also known to store sets of such digitally encoded samples in memory means for later retrieval and reconstruction of the original complex wave. For example, voice synthesis systems have been constructed in which spoken words are stored in memory as sequences of digitally encoded samples, and an analog voice signal is synthesized by sequentially applying the samples for selected words to a digital-to-analog converter.

In many applications, the recent development of low-cost digital integrated circuit elements has made possible the replacement of analog circuit elements with combinations of digital circuit elements. Digital circuit elements are typically more reliable, smaller, less costly, and use less power than the prior art analog elements. Thus, it is desirable to provide digital circuits to replace the prior art analog circuits, such as those described in the Baker patent, in modulators for generating phase-modulated carrier waves.

Prior art systems for digitally synthesizing analog waves have typically assembled sequences of digitally encoded samples representing selected stored wave segments, such as samples comprising words in the voice synthesis system referred to above. It might be considered that a system similar to that used for voice synthesis could be used in which carrier waves having different phases are simply substituted for the words. However, a satisfactory phase modulator should be capable of blending one carrier-wave segment into the next without the change in phase being too abrupt. Further, a satisfactory phase modulator must be capable of selecting the phase of each carrier-wave segment according to applied data so that the correct phase shift is generated in the carrier wave to encode each data element. The digital modulator contemplated by this invention includes digital means for blending successive carrier-wave segments, and digital means for selecting the phase of each carrier-wave segment according to the applied data elements.

SUMMARY OF THE INVENTION

Digital apparatus for synthesizing a phase-modulated carrier wave according to applied digital data elements includes a memory storing a number of carrier-wave segments. Each segment has a unique phase, and is stored as a set of digitally encoded samples. A digital-to-analog converter is connected to convert sequentially read samples of selected segments into the phase-modulated carrier wave. A combinational logic circuit selects the next segment to be read according to the current data element and the phase of the previously selected segment. In one embodiment, samples from overlapped segments are read alternately and components resulting from the sampling process are removed by a filter to blend the overlapped segments. In other embodiments, samples from overlapped segments are added.

These and other aspects of the invention will become apparent from the following detailed description and the attached drawing.

BRIEF DESCRIPTION OF THE DRAWING

FIG. 4 is a graphical representation illustrating one method of combining samples from two overlapped carrier-wave segments;

DETAILED DESCRIPTION

The digital modulator of the invention will be described mainly in terms of an embodiment for generating a phase-modulated carrier wave whose phase shifts of 45°, 135°, 225°, and 315° encode data elements having the respective bit configurations 11, 10, 00, and 01 applied to the modulator by an external data source. Such a modulator can be termed a four-phase digital modulator. It will be understood that this description is exemplary only, and is for purposes of explanation, not limitation. It will be readily appreciated by one skilled in the art that the inventive concept is applicable to other digital modulators.

Figure 1:
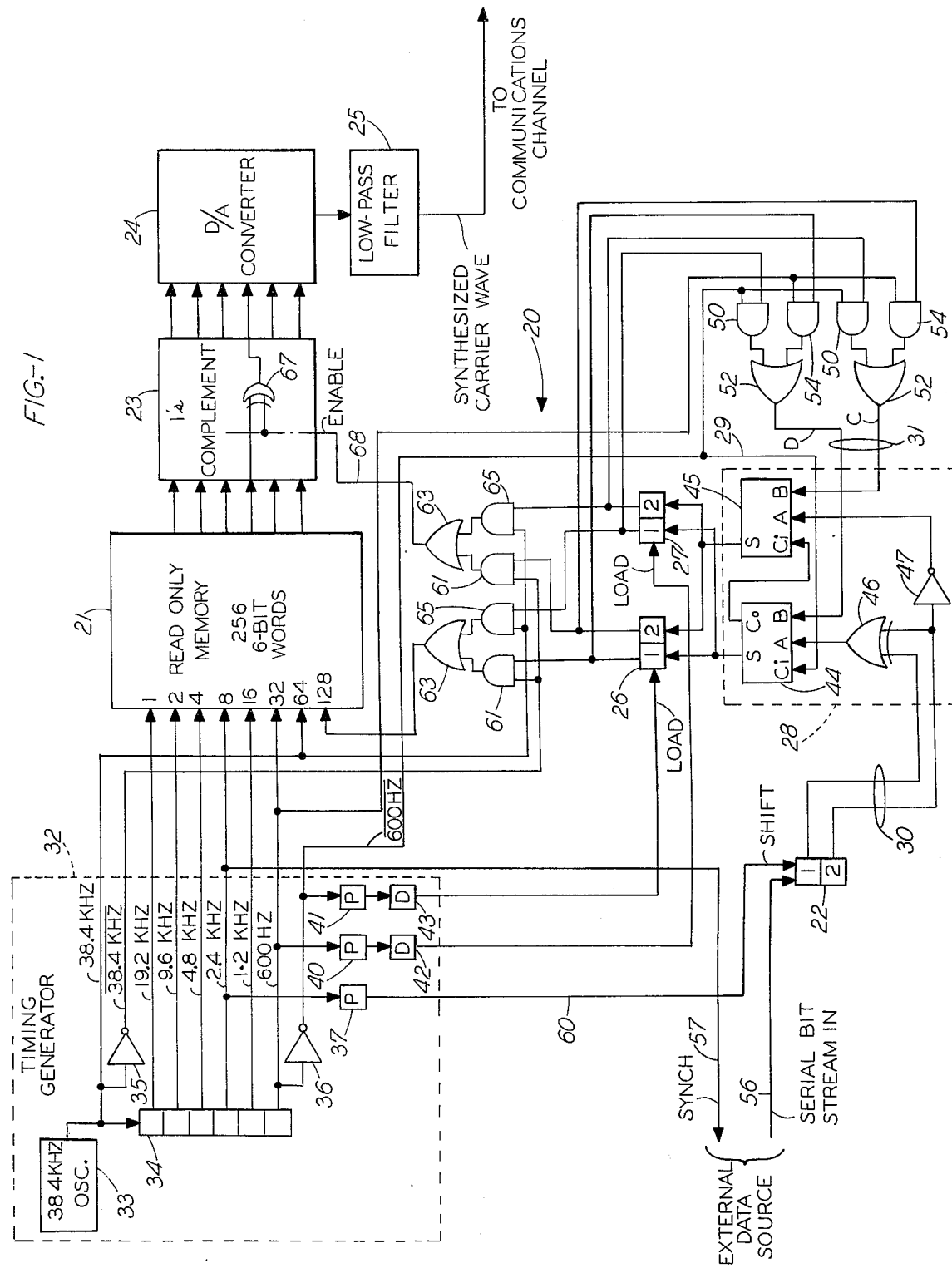
FIG. 1 is a block schematic diagram of a modulator for synthesizing a phase-modulated carrier wave according to the invention.

Referring now to FIG. 1, modulator 20 is a four-phase digital modulator, according to the invention, for generating a phase-modulated carrier wave whose phase shifts of 45°, 135°, 225°, and 315° encode data elements having the bit configurations 11, 10, 00, and 01, respectively.

Memory 21 stores digitally encoded samples of differently phased carrier-wave segments. These segments are selected sequentially according to digital input data received by shift register 22, and the samples of the selected segments are applied by memory 21 through complement circuit 23 to the input of digital-to-analog converter 24. Thus, the output of converter 24 is a carrier wave, synthesized from the carrier-wave segments stored in memory 21, wherein the phase shifts between segments encode the applied digital data. The output from converter 24 is filtered by low-pass filter 25 to remove unwanted frequency components resulting from the sampling process.

The addresses of selected carrier-wave segments are loaded into either segment address register 26 or segment address register 27 by segment selector 28. Selector 28 is a combinational circuit having a first input from shfit register 22 via leads 30, a second input from either register 26 or register 27 via leads 31, and a third input from the 600 Hz signal via lead 29.

Timing generator 32, which provides timing signals to the various elements of modulator 20, comprises 38.4 KHz square-wave oscillator 33, counter 34, inverters 35 and 36, pulse generating circuits 37, 40, and 41, and delay circuits 42 and 43. Each of pulse generating circuits 37, 40, and 41 generates a single output pulse when the input thereto changes from 0 to 1. Each of delay circuits 42 and 43 generates an output pulse a short time, e.g., 1 microsecond, after an input pulse thereto occurs. Such pulse and delay circuits are well known in the art. Several timing signals are taken directly from the outputs of the stages of counter 34, which divides the 38.4 KHz signal down to square-wave signals having frequencies of 19.2 KHz, 9.6 KHz, 4.8 KHz, 2.4 KHz, 1.2 KHz, and 600 Hz. Inverters 35 and 36 generate 38.4 KHz and 600 Hz signals, respectively.

Segment selector 28 comprises full adders 44 and 45, exclusive-OR gate 46, and inverter 47. AND-gates 50 direct output signals from register 27 through OR-gates 52 via leads 31 into adders 44 and 45 when the 600 Hz signal is 1. AND-gates 54 direct the output signals from register 26 through OR-gates 52 via leads 31 into adders 44 and 45 when the 600 Hz signal is 1.

The serial bit stream on input lead 56 is clocked at 2400 bits per second by the 2.4 KHz timing signal provided to the external data source on lead 57. Shift pulses are generated by pulse circuit 37 on lead 60 at 2400 pulses per second. These pulses shift the data on lead 56 into shift register 22. Thus, a new 2-bit data element, called a dibit combination, is stored in shift register 22 1200 times per second.

AND-gates 61 direct output signals from register 26 through OR-gates 63 into the 128-weight address input of memory 21 and via lead 68 to the ENABLE input of complement circuit 23. Similarly, AND-gates 65 direct output signals from register 27 through OR-gates 63 into the 128-weight address input of memory 21 and the ENABLE input of complement circuit 23.

Complement circuit 23, when enabled, forms the 1's complement of the binary word applied to it by memory 21. Complement circuit 23 comprises a number of exclusive-OR gates, such as gate 67; one gate for each data lead from memory 21. These gates complement the signals on the leads from memory 21 when the signal on lead 68 is 1.

Digital-to-analog converter 24 can be any of the conventional circuits well known in the art. Low-pass filter 25 is a conventional circuit designed to attenuate frequencies in the range of the rate at which samples are applied to the filter, which in this embodiment is 38.4 KHz, and harmonics thereof.

Four carrier-wave segments are stored in memory 21, each comprising 64 samples encoded as 6-bit words. Samples of two overlapping segments are addressed alternately, that is, a sample from the second half of one segment is addressed, then a sample from the first half of a following segment is addressed, and so on. The four carrier-wave segments have phases of 0°, 45°, 90°, and 135° with respect to an arbitrary reference. By complementing the samples representing these segments, four more segments having phases of 180°, 225°, 270°, and 315° with respect to the arbitrary reference can be generated. These eight segments suffice to synthesize all necessary phase shifts for this embodiment.

Figure 2A:
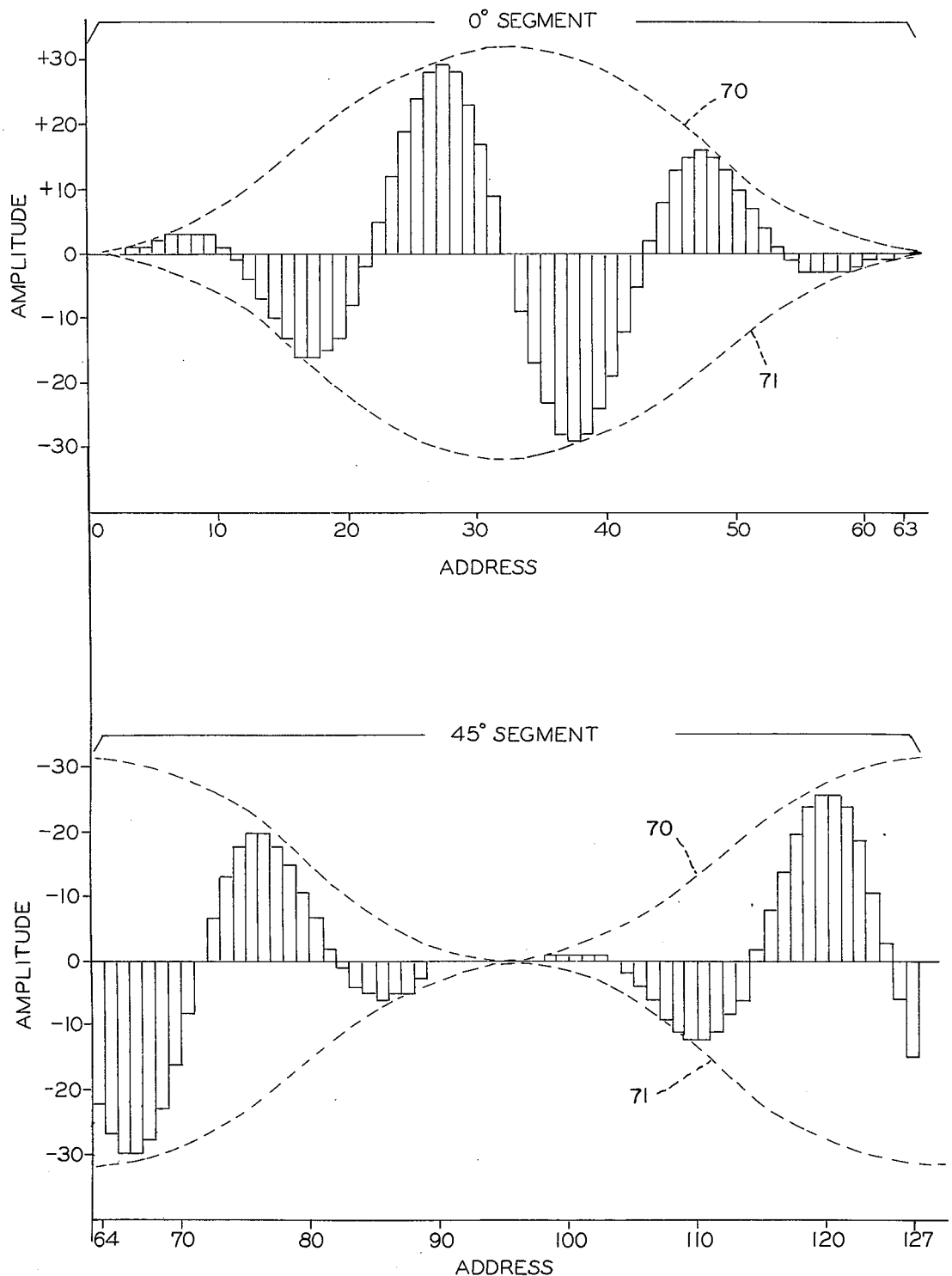
FIGS. 2A and 2B are graphical representations of carrier-wave segments encloded as digital samples and stored in a memory shown in FIG. 1.
Figure 2B:
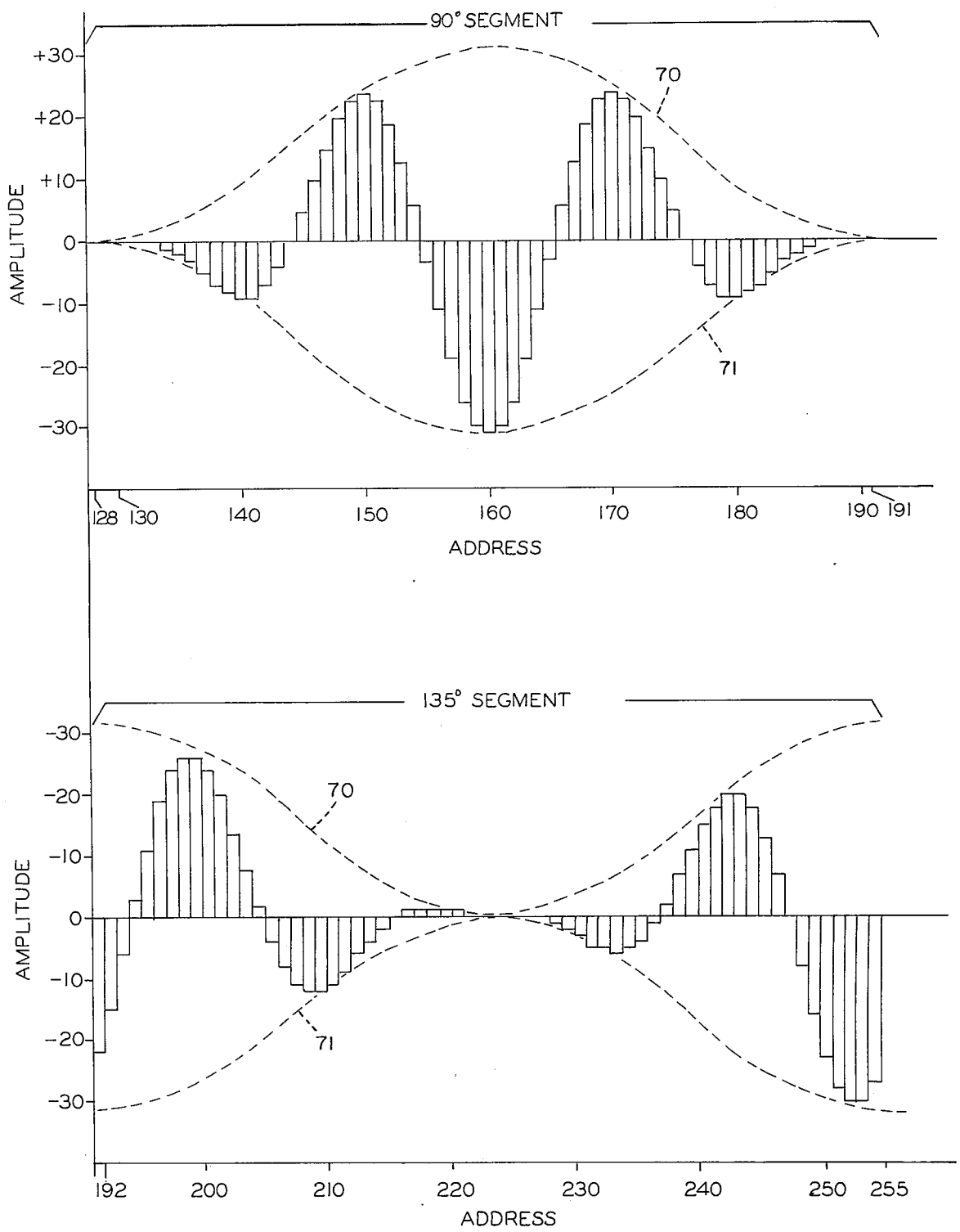

FIGS. 2A and 2B are graphical representations of the amplitudes of the samples stored in memory 21 that represent the 0°, 45°, 90°, and 135° wave segments. Note that each wave segment is a sinusoid modulated by an envelope function, namely, a raised cosine function indicated by dotted lines 70 and 71. The modulation, which facilitates blending overlapped wave segments, is achieved by scaling the amplitudes of the samples to fit both the sinusoid and the envelope function. Addresses of the samples comprising the wave segments are indicated along the horizontal axis of each segment. Note that the samples for the 45° segment and the 135° segment are stored so that the sample at the midpoint of the segment is stored at the lowest-numbered address. This facilitates address generation for overlapping segments, as will become evident below.

In this embodiment, each segment comprises 64 6-bit samples, each sample having an amplitude in the range from −31 (binary 100000) to +31 (binary 011111). Clearly the number of bits per sample, or the number of samples in each segment could be changed, if desired.

Figure 3:
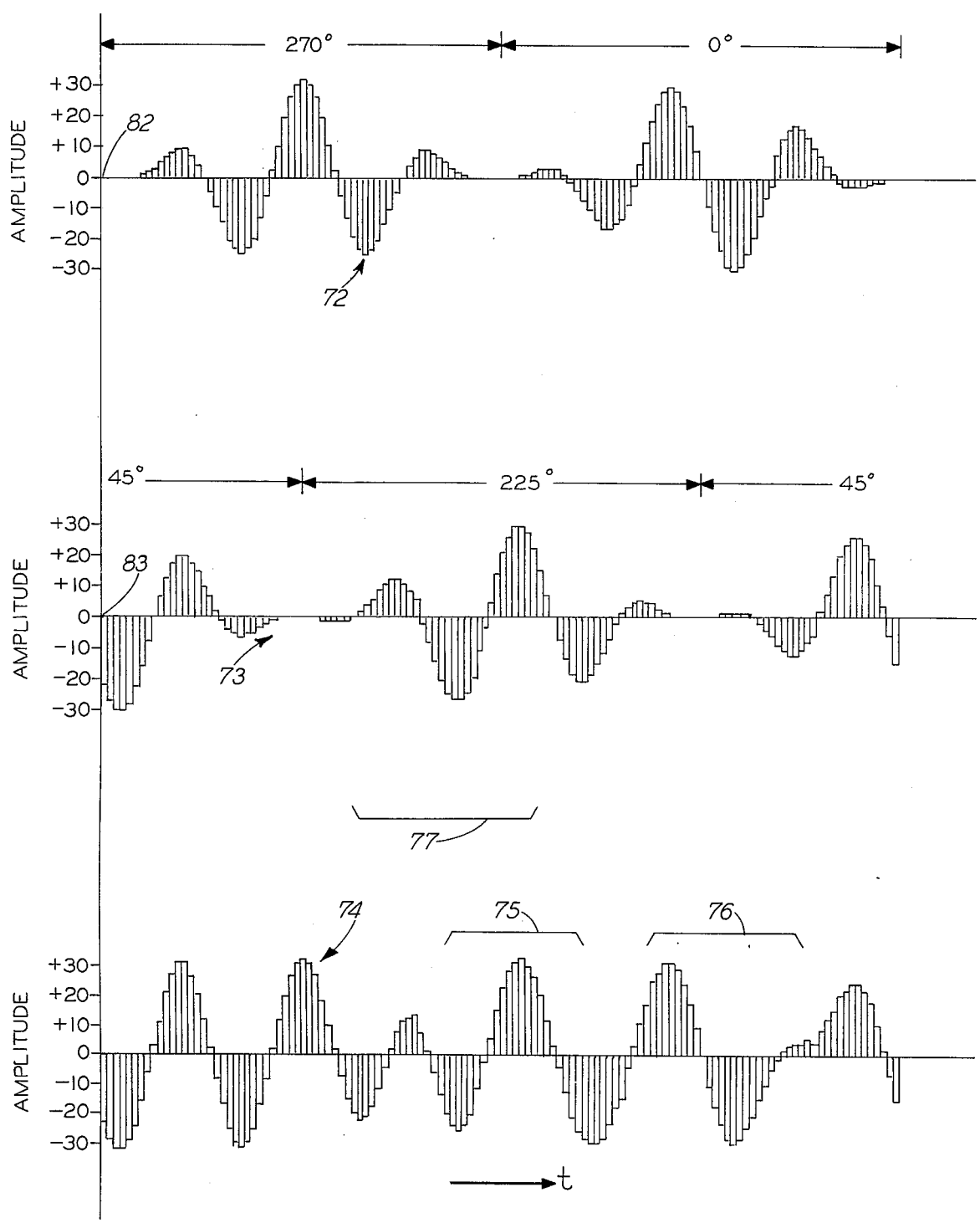
FIG. 3 is a graphical representation illustrating relationships among several carrier-wave segments in synthesizing the phase-modulated carrier wave.

FIG. 3 shows graphically how the samples of the selected carrier-wave segments are combined by addition to form the output wave. Wave 72 comprises an exemplary sequence of samples addressed in turn by register 26, and wave 73 comprises an exemplary sequence of samples addressed in turn by register 27. Wave 74 comprises a sequence of samples that are the algebraic sums of corresponding samples in waves 72 and 73. The amplitude of a segment in wave 72 is maximum when the amplitude of a correspondingly addressed segment in wave 73 is minimum, and vice-versa. Thus, for example, in region 75 of wave 74 the 225° segment from wave 73 is dominant, and in region 76 of wave 74 the 0° segment from wave 72 is dominant. Because of the envelope modulation of the samples comprising each segment, the transition in phase between successive overlapped segments is effected gradually.

The overlapped segments can be combined by algebraically adding samples of each segment that correspond in time, as indicated in FIG. 3, and as will be described later in conjunction with descriptions of alternate embodiments. In this embodiment, however, the same result is achieved by alternately addressing samples of the overlapped segments and suppressing, with low-pass filter 25, the large sampling frequency component that results in the output of converter 24. This principle is illustrated in FIG. 4, in which wave 80 is the output of converter 24, and wave 81 is the resulting output of filter 25. In wave 80, alternate samples relate to samples taken respectively from waves 72 and 73 in region 77 of FIG. 3; samples from wave 72, such as sample 84, are indicated by open bars; and samples from wave 73, such as sample 85, are indicated by shaded bars. Because the samples are applied to converter 24 at a sampling rate of 38.4 KHz, a 38.4 KHz component predominates in wave 80, which is attenuated by the action of filter 25 to produce wave 81.

Referring back to FIG. 3, memory addresses of some of the constituent samples of the illustrated segments can be compared. For example, the memory address of sample 82 of the 270° segment (which comprises the complemented samples of the 90° segment) in wave 72, is 128, and the address of sample 83 of the first 45° segment in wave 73, which corresponds substantially in time with sample 82, is 64. These addresses are written in binary notation as 10000000 and 01000000, respectively.

The six least significant bits of the addresses of samples in waves 72 and 73 that correspond substantially in time are identical, for example, as in the addresses of samples 82 and 83 above. These six address bits are supplied to memory 21 directly from counter 34, as shown in FIG. 1, so that the 64 samples comprising a given carrier-wave segment are addressed sequentially as the six stages of counter 34 are cycled through their 64 states.

The four segments stored in memory 21 are selected according to the states of the 64-weight and 128-weight address bits, and their complements are selected according to the state of the ENABLE input of 1's complement circuit 23. Table I shows the correspondence between the possible states of these signals and the segment selected by each state.

Referring back to FIG. 1, note that the 64-weight address bit for memory 21 is determined by the 38.4 KHz signal, the 128-weight address bit is determined by the contents of stage 1 of one of select registers 26 and 27, and the ENABLE input of 1's complement circuit 23 is determined by the contents of stage 2 of one of select registers 26 and 27. Thus, when the 38.4 KHz signal is 0, the contents of register 26 select either the 0°, 90°, 180°, or 270° segments, and when the 38.4 KHz signal is 1, the contents of register 27 select either the 45°, 135°, 225°, or 315° segments.

Table II shows the relationships among the input and output signals necessary for segment selector 28. It can be shown by using well-known analytical techniques that the combinational logic circuit shown for selector 28 implements the relationships shown in Table II. It will also be clear that these relationships could also be obtained by using other combinational circuits, or such means as a read-only memory wherein the inputs in Table II are the memory addresses and the outputs in Table II are the data stored in the addressed locations.

TABLE II

| Inputs to Segment Selector 28 | | | | | | | Outputs From Segment Selector 28 | | | |
|---|---|---|---|---|---|---|---|---|---|---|
| Reg. 22 Stages | | | Reg. 26 Stages | | Reg. 27 Stages | | Reg. 26 Stages | | Reg. 27 Stages | |
| 2 | 1 | 600 Hz | 2 | 1 | 2 | 1 | 2 | 1 | 2 | 1 |
| 0 | 0 | 0 | 0 | 0 | | | | | 1 | 0 |
| | | | 0 | 1 | | | | | 1 | 1 |
| | | | 1 | 0 | | | | | 0 | 0 |
| | | | 1 | 1 | | | | | 0 | 1 |
| 0 | 1 | 0 | 0 | 0 | | | | | 1 | 1 |
| | | | 0 | 1 | | | | | 0 | 0 |
| | | | 1 | 0 | | | | | 0 | 1 |
| | | | 1 | 1 | | | | | 1 | 0 |
| 1 | 0 | 0 | 0 | 0 | | | | | 0 | 1 |
| | | | 0 | 1 | | | | | 1 | 0 |
| | | | 1 | 0 | | | | | 1 | 1 |
| | | | 1 | 1 | | | | | 0 | 0 |
| 1 | 1 | 0 | 0 | 0 | | | | | 0 | 0 |
| | | | 0 | 1 | | | | | 0 | 1 |
| | | | 1 | 0 | | | | | 1 | 0 |
| | | | 1 | 1 | | | | | 1 | 1 |
| 0 | 0 | 1 | | | 0 | 0 | 1 | 1 | | |
| | | | | | 0 | 1 | 0 | 0 | | |
| | | | | | 1 | 0 | 0 | 1 | | |
| | | | | | 1 | 1 | 1 | 0 | | |
| 0 | 1 | 1 | | | 0 | 0 | 0 | 0 | | |
| | | | | | 0 | 1 | 0 | 1 | | |
| | | | | | 1 | 0 | 1 | 0 | | |
| | | | | | 1 | 1 | 1 | 1 | | |
| 1 | 0 | 1 | | | 0 | 0 | 1 | 0 | | |
| | | | | | 0 | 1 | 1 | 1 | | |
| | | | | | 1 | 0 | 0 | 0 | | |
| | | | | | 1 | 1 | 0 | 1 | | |
| 1 | 1 | 1 | | | 0 | 0 | 0 | 1 | | |
| | | | | | 0 | 1 | 1 | 0 | | |
| | | | | | 1 | 0 | 1 | 1 | | |
| | | | | | 1 | 1 | 0 | 0 | | |

TABLE I

| 1's Complement ENABLE | 128-weight address bit | 64-weight address bit (38.4 KHz) | Segment Selected |
|---|---|---|---|
| 0 | 0 | 0 | 0° |
| 0 | 0 | 1 | 45° |
| 0 | 1 | 0 | 90° |
| 0 | 1 | 1 | 135° |
| 1 | 0 | 0 | 180° |
| 1 | 0 | 1 | 225° |
| 1 | 1 | 0 | 270° |
| 1 | 1 | 1 | 315° |

Figure 5:
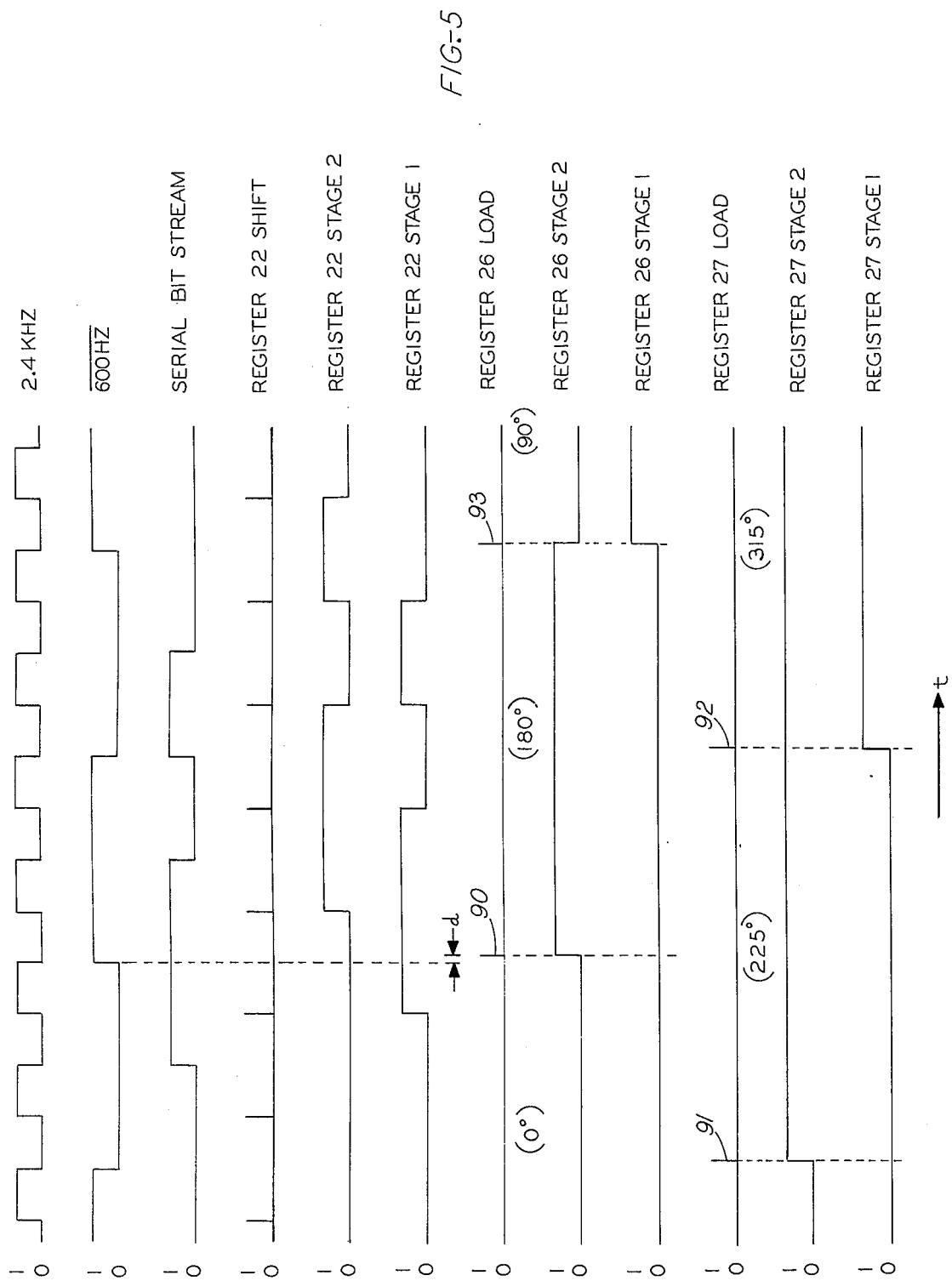
FIGS. 5 and 6 are timing diagrams relating to the operation of the modulator of FIG. 1.
Figure 6:
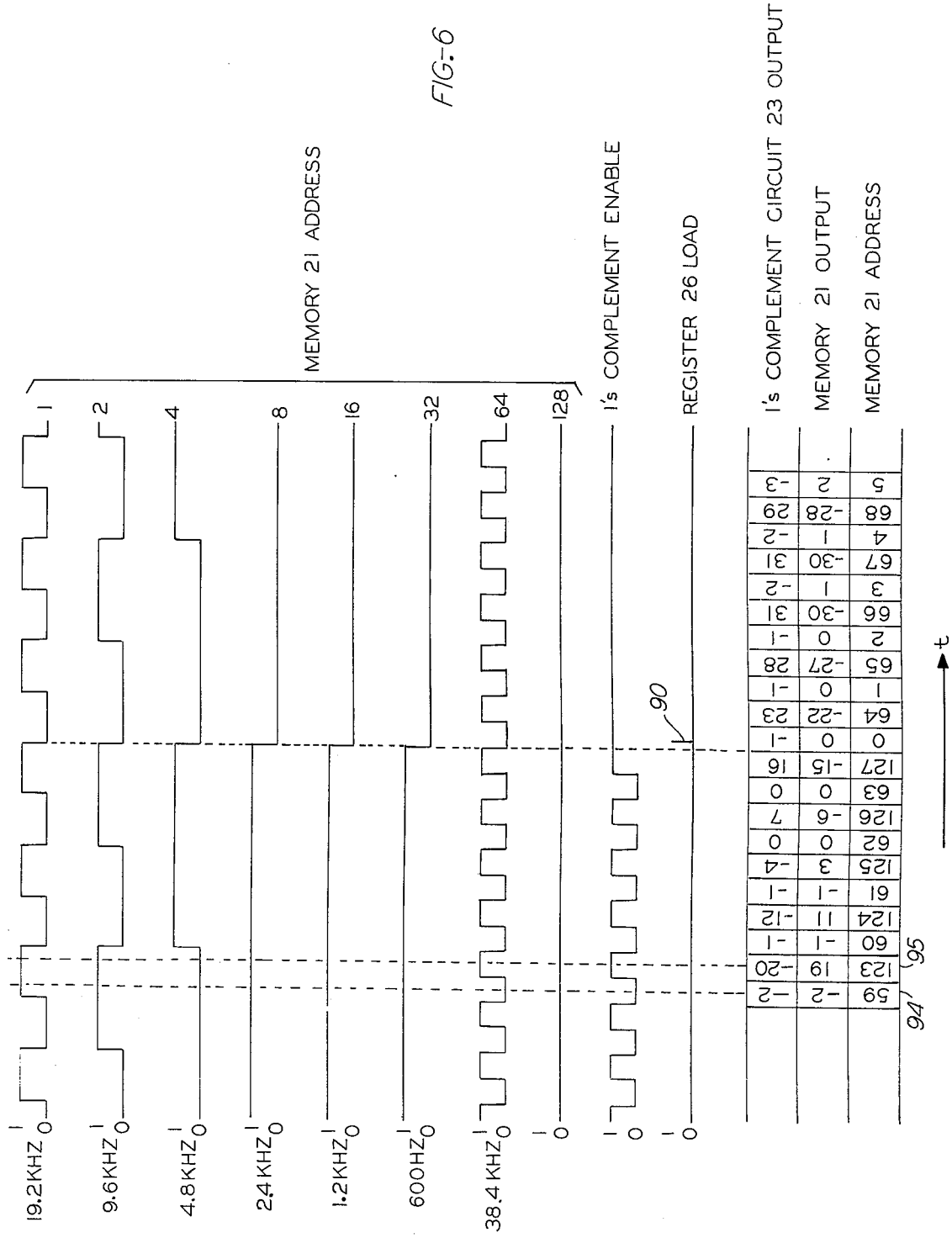

FIGS. 5 and 6 are timing diagrams that relate the various signals in the apparatus shown in FIG. 1. FIG. 5 shows certain signals over a period encompassing several dibit intervals; FIG. 6 shows certain signals over a period from shortly before to shortly after pulse 90 in FIG. 5.

Referring to FIG. 5, the 2.4 KHz and 600 Hz signals are shown for reference. A sample portion of a serial bit stream is shown wherein the transitions coincide with the 1-0 transitions in the 2.4 KHz signal. However, it will be clear that these transitions may vary somewhat in actual practice, depending on the characteristics of the external data source. Pulses comprising the SHIFT signal correspond to the 0-1 transitions of the 2.4 KHz signal, by the action of pulse circuit 37 in FIG. 1. The contents of stages 1 and 2 of shift register 22 lag the serial bit stream because of the delaying action of shift register 22.

Pulse 91 in the register 27 LOAD signal occurs a time d after the 0-1 transition in the 600 Hz signal, by the action of pulse circuit 40 and delay circuit 42 in FIG. 1. Thus, pulse 91 causes register 27 to be loaded with the output of segment selector 28; which, at this point in time, is being presented with input 00 from register 26, via gates 50 and 52, dibit combination 00 from register 22, and 0 from the 600 Hz signal. Referring to Table II, it can be seen that such an input combination results in an output of 10, which is then loaded into register 27 by pulse 91. The delay d preceding pulse 91 should be long enough, for example, 1 microsecond, to allow the output of selector 28 to settle after the preceding 0-1 transition in the 600 Hz signal.

Pulse 90 similarly causes register 26 to be loaded with the output of segment selector 28; which, at this point in time, is being presented with input 10 from register 27, via gates 54 and 52, dibit combination 01 from register 22, and 1 from the 600 Hz signal. Referring again to Table II, the output of segment selector 28 for this particular combination of inputs is 10, which is then loaded into register 26 by pulse 90. Subsequently, register 27 is loaded with 11 by pulse 92, and register 26 is loaded with 01 by pulse 93.

The carrier-wave segments selected by the successive words stored in registers 26 and 27 are indicated in the appropriate regions; the sequence of segments selected is 0°, 225°, 180°, 315°, and 90°, with succeeding segments overlapping.

Referring now to FIG. 6, the period from shortly before to shortly after pulse 90 is shown in more detail. Specifically shown in FIG. 6 are the address signals for memory 21, the ENABLE signal for 1's complement circuit 23, and the LOAD signal, containing pulse 90, for register 26. Below the representations of these signals is a table listing, for each sample being read from memory 21, the decimal equivalent of the address signals, the output of memory 21 for each address, and the output of 1's complement circuit 23.

As an example of the functioning of this embodiment of the invention, the addressing and processing of the samples shown in columns 94 and 95 will be described. The dotted lines extending vertically in these columns aid in relating the states of the various signals to the entries in the table. Referring to column 94, the binary address is 00111011, the equivalent of decimal 59 shown in the table. The binary equivalent of −2 is stored in location 59. Since the ENABLE signal is 0, the corresponding output of complement circuit 23 is also −2.

Similarly, the binary address in column 95 is 01111011, the equivalent of decimal 123 shown in the table; the binary equivalent of 19 is stored in location 123; and since the ENABLE signal is 1 in column 95, the output of complement circuit 23 is the 1's complement of 19, i.e., −20. Note that the ENABLE signal alternates between 1 and 0 before pulse 90, reflecting the different state of stages 1 of registers 26 and 27 during this period; and that the ENABLE signal remains 0 after pulse 90, since both stages 1 of registers 26 and 27 are 0 during this period. Note also that the 128-weight signal remains 0 throughout the entire exemplary period shown in FIG. 6, since stages 2 of both registers remain 1 throughout.

Figure 7:
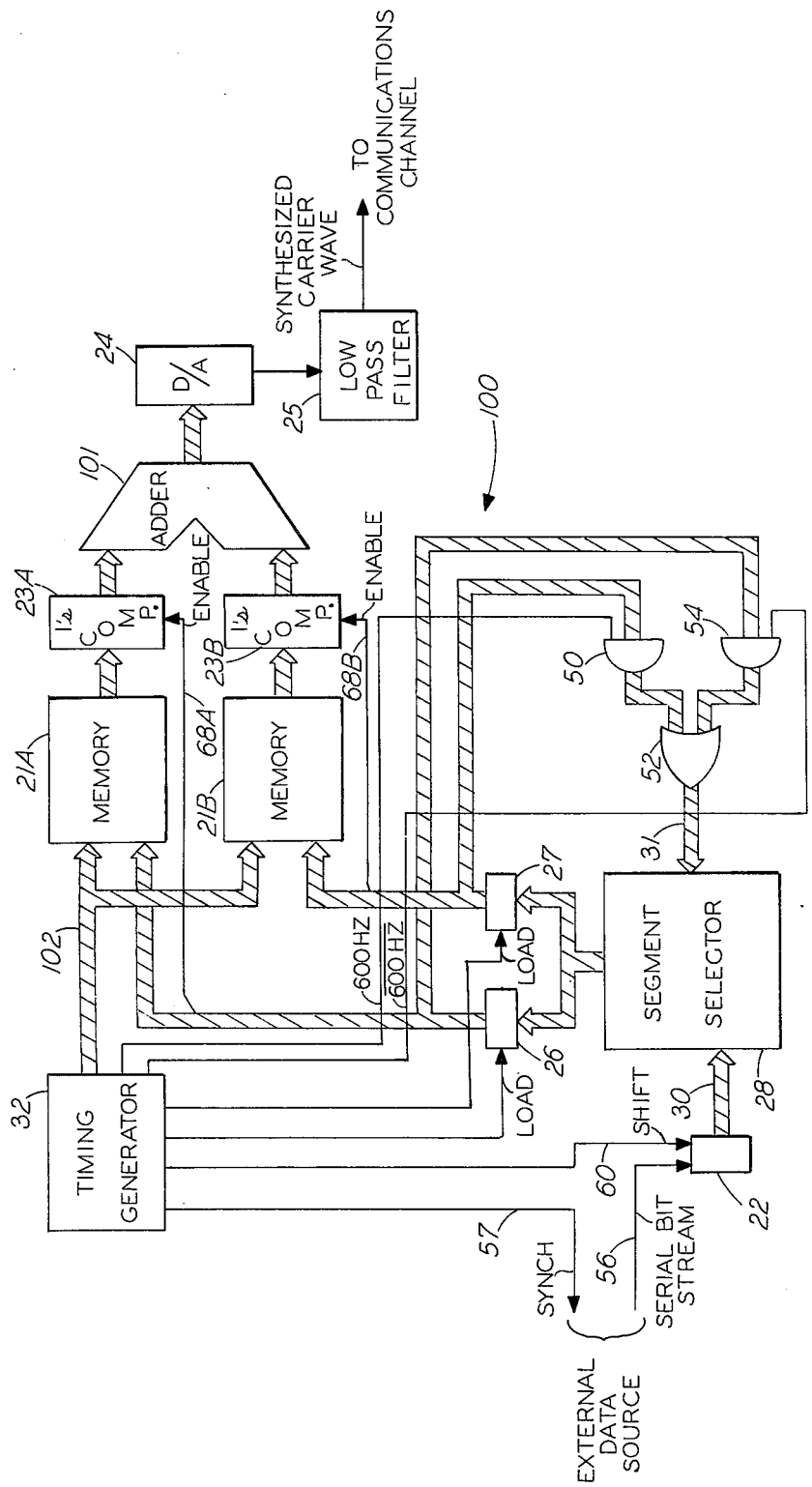
FIG. 7 is a block schematic diagram of an alternate embodiment of a modulator according to the invention including two memories and a binary adder.

FIG. 7 is a block schematic diagram of an alternate embodiment of a modulator, according to the invention. Referring to FIG. 7, modulator 100 comprises essentially the elements of modulator 20, with the memory in two sections 21A and 21B, and with the addition of binary adder 101, and two 1's-complement circuits 23A and 23B. Multiple-lead paths are indicated as shown for path 102. For convenience and for comparison purposes, the embodiment shown as modulator 100 will be described as generating the same four-phase carrier wave specified for modulator 20, so that the multi-lead paths generally contain the same numbers of leads as in modulator 20 in FIG. 1. However, it will be clear that modulator 20 and modulator 100 can also be used for similar phase modulation schemes wherein different numbers of leads are appropriate in the multi-lead paths.

Memories 21A and 21B each store segments that are selected by registers 26 and 27, respectively. One stage in each of registers 26 and 27 is connected via leads 68A and 68B to the ENABLE inputs of complement circuits 23A and 23B.

Samples from the two selected segments are addressed simultaneously by signals supplied by timing generator 32 to both memories 21A and 21B in parallel via path 102 Since two samples are addressed simultaneously in modulator 100, not alternately as in modulator 20, the 38.4 KHz timing signals used in modulator 20 are not needed in modulator 100. Therefore, path 102 contains six leads carrying the 19.2 KHz, 9.6 KHz, 4.8 KHz, 2.4 KHz, 1.2 KHz and 600 Hz signals to both memories 21A and 21B.

The simultaneously addressed samples from memories 21A and 21B are applied to binary adder 101, which comprises a plurality of full adder stages similar to full adders 44 and 45 in FIG. 1. Adder 101 adds the two samples and applies the sum to digital-to-analog converter 24. Thus, the output from converter 24 comprises a sequence of analog samples forming essentially the synthesized carrier wave.

Referring back to FIG. 3, waves 72 and 73 can be thought of as graphical examples of inputs to adder 101, and wave 74 can be thought of as a graphical example of the output from adder 101.

Since the wave at the output of converter 24 in modulator 100 comprises added samples instead of alternated samples, as in modulator 20, the incremental change from one sample to the next is typically less in modulator 100 than in modulator 20. Therefore, the magnitude of the sampling frequency that must be removed by low-pass filter 25 is less in modulator 100, so that the requirements for filter 25 are less stringent. If the synthesized carrier wave is to be transmitted over a typical voice telephone circuit, having enough high-frequency attenuation to suppress the sampling frequency, filter 25 can be omitted.

The symbols 50, 52, and 54 each represent a plurality of gates, one gate for each lead in the data paths from registers 26 and 27 to segment selector 28. The operation of these gates, shift register 22, and segment selector 28 in loading registers 26 and 27 is identical to that of similar numbered elements in FIG. 1.

Figure 8:
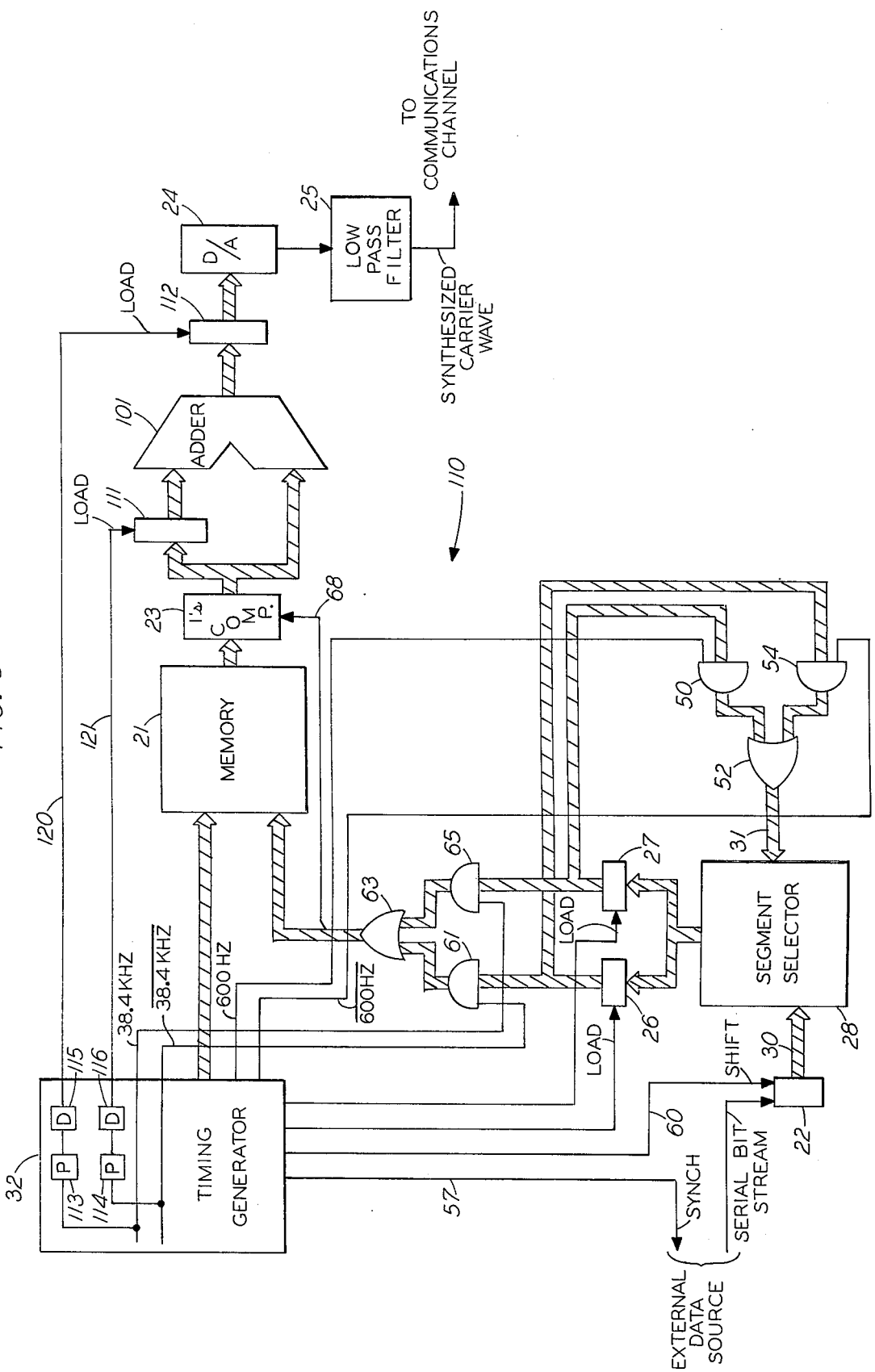
FIG. 8 is a block schematic diagram of another alternate embodiment of the invention including a single memory, intermediate registers, and a binary adder.

FIG. 8 is a block schematic diagram of another embodiment of a modulator according to the invention. Referring to FIG. 8, modulator 110 comprises similar elements to modulator 100 described above, except that memory 21 is once again a single memory, registers 111 and 112 are included, and timing generator 32 is modified to include pulse circuits 113 and 114 and delay circuits 115 and 116. Pulse circuit 113 and delay circuit 115 act to generate a pulse on lead 120 a time $d'$ after a 0 to 1 transition in the 38.4 KHz timing signal. Similarly, pulse circuit 114 and delay circuit 116 act to generate a pulse on lead 121 a time $d'$ after a 0 to 1 transition in the 38.4 KHz timing signal. The time $d'$ is long enough to allow the state of the circuitry to settle before the pulses on leads 120 or 121 load registers 111 or 112, e.g., 1 microsecond.

Memory 21 again stores samples of all the segments necessary to synthesize the carrier wave, for example, four segments for the four-phase carrier wave described above. Registers 111 and 112 temporarily store individual six-bit samples.

In operation, samples are read alternately from segments addressed by registers 26 and 27, as in modulator 20 shown in FIG. 1. When the 38.4 KHz signal is 1, the segment is selected by the contents of register 26. A time $d'$ after a 0-1 transition in the 38.4 KHz signal, a pulse generated on lead 121 by the action of circuits 114 and 116 loads register 111 with the output of memory 21, complemented or not depending on the signal on lead 68. Then, when the 38.4 KHz signal becomes 1, the segment address is determined by the contents of register 27, and a time $d'$ after the 0-1 transition in the 38.4 KHz signal, the pulse generated on lead 120 by the action of circuits 113 and 115 loads register 112 with the output of adder 101. Thus, register 112 becomes loaded with the sum of the currently addressed sample and the preceding sample temporarily stored in register 111, and the sequence of outputs of register 112 is substantially equivalent to the sequence of outputs of adder 101 in modulator 100 shown in FIG. 7.

In the embodiments of the invention described so far, pairs of segments that are 180° out of phase have been generated by storing samples representing one of the segments of such a pair and taking the 1's complement of each sample of the stored segment to obtain the other segment of the pair. As has been described, the 1's complement of a binary number is obtained by simply inverting each bit of the number. However, the 1's complement of a binary number is not quite the exact negative of the number, but is one unit less than the exact negative, which thus can be formed by adding 1 to the 1's complement. Forming the 1's complement is straightforward, requiring an exclusive-OR gate for each bit in the number being complemented, as described above. Forming the 2's complement requires an adder to augment the 1's complement by 1. In embodiments of the invention such as modulator 20, forming the 2's complement would require the inclusion of an adder. However, where an adder is used to add samples as in modulator 110, a slight rearrangement makes possible the use of the same adder both to add successive pairs of samples and to augment the 1's complement to form the 2's complement. This rearrangement is accomplished as shown in FIG. 9.

Figure 9:
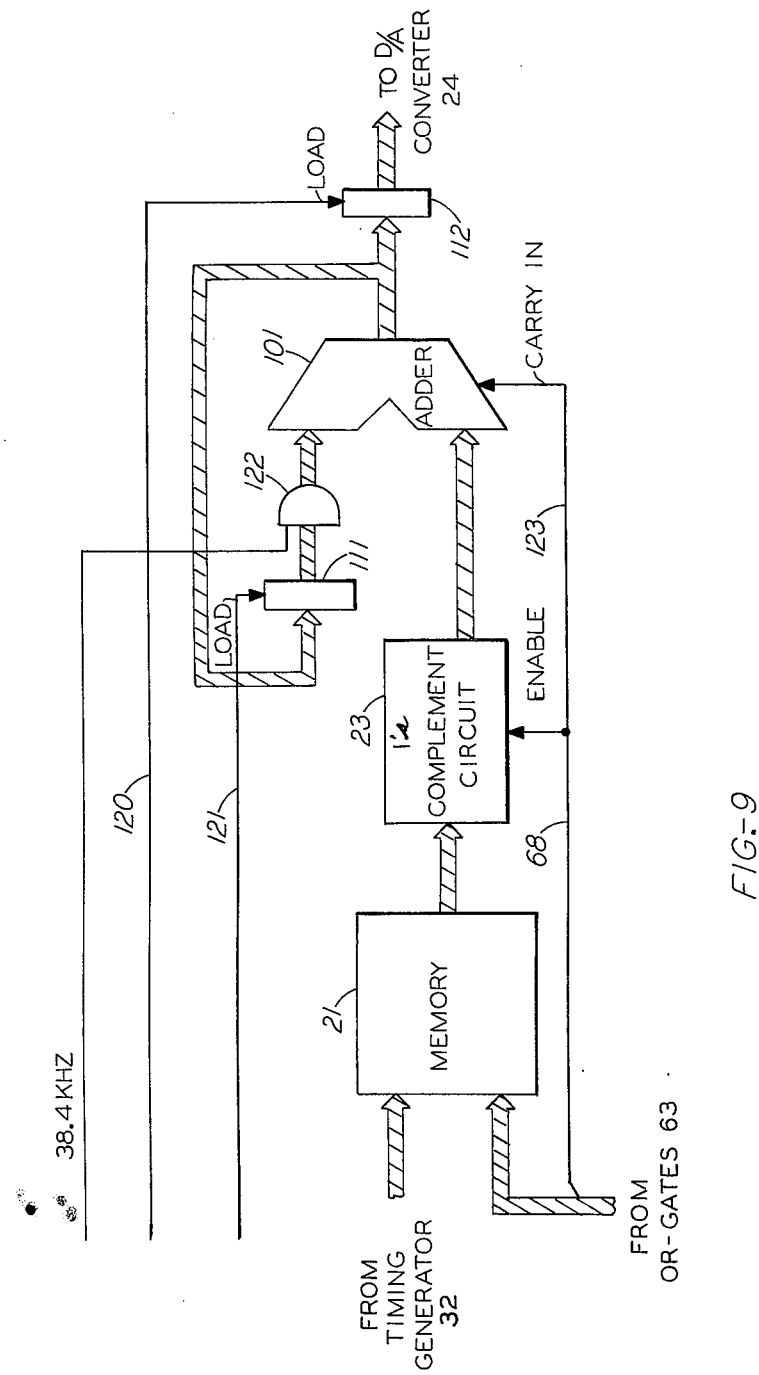
FIG. 9 is a block schematic diagram of a modification of the modulator of FIG. 8 wherein 2's complements of selected samples are formed instead of 1's complements.

Referring to FIG. 9, the output of 1's complement circuit 23 is connected directly to one of the inputs of adder 101. The output of adder 101 is connected to both registers 111 and 112 so these registers can be loaded with the output of adder 101 by the pulses on leads 120 and 121. The 38.4 KHz signal is connected to AND-gates 122, which serve to apply the contents of register 111 to the other input of adder 101 when the 38.4 KHz signal is 1. Lead 123 connects lead 68 to the CARRY IN input of adder 101, which was not used in modulators 100 and 110, described above.

In operation, alternate samples read from memory 21 are routed differently, according to the 38.4 KHz and 38.4 KHz signals. After a 0-1 transition in the 38.4 KHz signal, a pulse on lead 121 loads register 111. At this time, the 38.4 KHz signal is 0, so gates 122 are not enabled. If the 2's complement of the current sample is to be formed, the signal on leads 68 and 123 is 1, enabling 1's complement circuit 23 and the CARRY IN input of adder 121. Thus, circuit 23 forms the 1's complement of the sample and the enabled CARRY IN input causes adder 101 to add 1 to the 1's complement, thereby forming the 2's complement. After the next 0-1 transition in the 38.4 KHz signal, gates 122 are enabled, so that the sample stored in register 111 is added by adder 101 to the next sample from memory 21, and after a time $d'$, a pulse on lead 120 stores this sum in register 112. If the 2's complement of the next sample is to be formed, indicted by a 1 on leads 68 and 123, circuit 23 forms the 1's complement of the output of memory 21 and adder 101 adds 1 to the sum of the output of circuit 23 and the contents of register 111. The digital contents of register 112 are again converted to analog form by converter 24 to form the synthesized carrier wave.

The choice of whether to form the 1's complement or the 2's complement depends on how much quantizing error can be tolerated in the synthesized carrier wave. Since the 1's complement is 1 unit away from the 2's complement, the unit magnitude determines what the quantizing error will be. The more bits used to represent each sample, the less the unit magnitude. Thus, where each sample comprises a larger number of bits, the 1's complement circuit will be more likely to suffice than where each sample comprises a smaller number of bits. In the embodiments described above in which 6-bit samples are used to synthesize the carrier wave, the 1's complement circuit has been found satisfactory.

Many modifications could be made in the modulators described above without departing from the teachings of the invention; for example, modifications to register 22 for receiving data in parallel form, instead of in serial form, modifications throughout for synthesizing a carrier wave having other than four phase shifts, modifications to segment selector 28 for using alternate methods of relating succeeding data elements to succeeding carrier-wave segments, and the elimination of complementing means if the relative phases of the carrier-wave segments are not grouped in pairs having 180° phase differences. Apparatus for implementing such modifications would be readily apparent to one skilled in the art, given the teachings of the invention.

It will also be clear that the carrier frequency and the frequencies of the various timing frequencies described above are exemplary, and relate only to the specific embodiments described. The apparatus of the invention can be used in any modulators that would not be limited by the speed of operation of the necessary logic circuits. Thus, while the modulator embodiments described above synthesize carrier waves for transmission over low-bandwidth voice communications channels, the teachings of the invention can easily be applied by one skilled in the art to embodiments for synthesizing carrier waves requiring much greater bandwidth than a voice channel.

What is claimed is:

1. Apparatus for synthesizing a phase-modulated carrier wave according to digital data elements sequentially applied thereto, comprising:
   a memory for storing a plurality of predefined carrier-wave segments, each segment having a unique phase and being represented by a set of a plurality of digitally encoded samples;
   means for selecting, according to the current data element and the phase of the last selected carrier-wave segment, the next carrier-wave segment to be read from the memory;
   means for addressing the memory to sequentially read the samples representing each selected carrier-wave segment; and
   means connected to the output of the memory for combining at least some of the samples of the last selected carrier-wave segment with at least some of the samples of the next selected carrier-wave segment to generate the phase-modulated carrier wave at the output of the combining means as successive samples are applied by the memory thereto.

2. Apparatus of claim 1 wherein the selecting means comprises:
   an input register for storing the latest digital data element;
   at least one address register for storing the address of a selected carrier-wave segment; and
   means, responsive to the contents of the input register and the address register, for generating the address of a carrier-wave segment to be read, and for loading the generated address into the address register after the last sample of the preceding segment addressed thereby is read.

3. Apparatus according to claim 2 which further comprises:
   a complement circuit connected between the memory and the combining means, and
   means for enabling the complement circuit during the reading of one of the samples from the memory according to a portion of the address in the address register.

4. Apparatus according to claim 3 wherein the complement circuit comprises means for forming the 1's complement of the output of the memory.

5. Apparatus according to claim 3 wherein the complement circuit comprises means for forming the 2's complement of the output of the memory.

6. Apparatus for synthesizing a phase-modulated carrier wave according to digital data elements applied thereto, comprising:
   first and second memories for storing a plurality of carrier-wave segments, each segment having a unique phase and being represented by a set of digitally encoded samples;
   a parallel adder having a first input connected to the output of the first memory and a second input connected to the output of the second memory;
   a digital-to-analog converter connected to the output of the adder;
   means for selecting, according to the current data element and the phase of the last selected carrier-wave segment, the next carrier-wave segment to be read from either the first or second memory; and
   means for addressing the first and second memories to sequentially read the samples of each selected wave segment and to read at least some samples simultaneously from the first and second memories, to thereby add the simultaneously read samples in the parallel adder to generate the phase-modulated carrier wave at the output of the digital-to-analog converter as the successive samples are applied by the adder to the converter.

7. Apparatus of claim 6 wherein the selecting means comprises:
   an input register for storing the latest digital data element;
   first and second address registers, associated respectively with the first and second memories, for storing addresses of selected carrier-wave segments;
   means, responsive to the contents of the input register and alternately to the first and second address registers, for generating the address of the next carrier-wave segment to be read; and
   means for loading the generated address alternately into the second and first address registers after the last sample of the previous segment addressed thereby is read.

8. Apparatus according to claim 7 which further comprises:
   a first complement circuit connected between the first memory and the first input of the parallel adder,
   means for enabling the complement circuit during the reading of one of the samples from the first memory according to a portion of the address in the first address register,
   a second complement circuit connected between the second memory and the second input of the parallel adder, and
   means for enabling the second complement circuit during the reading of one of the samples from the second memory according to a portion of the address in the second address register.

9. Apparatus according to claim 8 wherein the first and second complement circuits each comprise means for forming the 1's complement of the output of the memory to which it is connected.

10. Apparatus according to claim 8 wherein the first and second complement circuits each comprise means for forming the 2's complement of the output of the memory to which it is connected.

11. Apparatus of claim 6 wherein the digitally encoded samples of each wave segment are scaled according to an envelope function to facilitate blending overlapped segments together.

12. Apparatus for synthesizing a phase-modulated carrier-wave according to digital data elements applied thereto, comprising:
   a memory for storing a plurality of carrier-wave segments, each segment having a unique phase, and being represented by a set of digitally encoded samples;
   an intermediate register;
   means for loading the intermediate register from the output of the memory;
   an adder having a first input connected to the output of the memory, and a second input connected to the output of intermediate register;
   an output register;

means for loading the output register from the output of the adder;

a digital-to-analog converter connected to the output register;

first and second address registers for storing addresses of selected carrier-wave segments;

means for alternately
- a reading from the memory the next sample of the carrier-wave segment addressed by the first address register and enabling the means for loading the intermediate register, so that the next sample of the carrier-wave segment addressed by the first address register is loaded into the intermediate register, and
- b reading from the memory the next sample of the carrier-wave segment addressed by the second address register and enabling the means for loading the output register so that the sum of the next sample of the carrier-wave segment addressed by the second address register and the next sample of the carrier-wave segment addressed by the first address register, previously stored in the intermediate register, is loaded into the output register;

the phase-modulated carrier wave being generated at the output of the digital-to-analog converter as the successive samples are applied thereto from the output register.

13. Apparatus of claim 12 wherein the digitally encoded samples of each wave segment are scaled according to an envelope function to facilitate blending overlapped segments together.

14. Apparatus according to claim 12 which further comprises:

an input register for storing the latest digital data element;

means, responsive to the contents of the input register and alternately to the first and second address registers, for generating the address of the next carrier-wave segment to be read; and means for loading the generated address alternately into the second and first address registers after the last sample of the previous segment addressed thereby is read.

15. Apparatus according to claim 14 which further comprises:

a complement circuit connected between the memory and the connections to the intermediate register loading means and to the first input of the adder; and means for enabling the complement circuit during the reading of a given sample from the memory, according to a portion of the address in the address register selecting the given sample.

16. Apparatus according to claim 15 wherein the complement circuit comprises means for forming the 1's complement of the output of the memory.

17. Apparatus according to claim 15 wherein the complement circuit comprises means for forming the 2's complement of the output of the memory.

18. Apparatus for synthesizing a phase-modulated carrier-wave according to digital data elements applied thereto, comprising:

a memory for storing a plurality of carrier-wave segments, each segment having a unique phase and being represented by a set of digitally encoded samples;

a 1's complement circuit having an input connected to the output of the memory, and an enabling input;

an adder having a first input connected to the output of the 1's complement circuit, a second input, and a carry input;

an intermediate register;

means for loading the intermediate register from the output of the adder;

means for gating the contents of the intermediate register into the second input of the adder;

an output register;

means for loading the output register from the output of the adder;

a digital-to-analog converter connected to the output register;

first and second address registers for storing addresses of selected carrier-wave segments, means for alternately
- a reading from the memory the next sample of the carrier-wave segment addressed by the first address register and enabling the means for loading the intermediate register so that the next sample of the carrier-wave segment addressed by the first address register is loaded into the intermediate register, and
- b reading from the memory the next sample of the carrier-wave segment addressed by the second address register and enabling both the means for loading the output register and the gating means so that the sum of the next sample of the carrier-wave segment addressed by the second address register and the next sample of the carrier-wave segment addressed by the first address register, previously stored in the intermediate register, is loaded into the output register;

means, responsive to the contents of the input register and alternately to the first and second address registers, for generating the address of the next carrier-wave segment to be read; and means for loading the generated address alternately into the second and first address registers after the last sample of the previous segment addressed thereby is read;

means for enabling both the 1's complement circuit and the carry input of the adder during the reading of a given sample from the memory, according to a portion of the address in the address register selecting the given sample;

the phase-modulated carrier wave being generated at the output of the digital-to-analog converter as the successive samples are applied to the converter by the output register.

19. Apparatus of claim 18 wherein the digitally encoded samples of wave segments are scaled according to an envelope function to facilitate blending overlapped segments together.

20. Apparatus for synthesizing a phase-modulated carrier wave according to digital data elements applied thereto, comprising:

a memory for storing a plurality of carrier-wave segments, each having a unique phase and comprising a set of digitally encoded samples;

a digital-to-analog converter connected to the output of the memory;

first and second address registers for storing addresses of selected carrier-wave segments;

means for alternately a reading from the memory the next sample of the wave segment addressed by the first register, and
  b reading from the memory the next sample of the wave segment addressed by the second register;

a low-pass filter, connected to the output of the digital-to-analog converter, for attenuating wave components having frequencies at or greater than the rate at which samples are applied to the digital-to-analog converter;

an input register for storing the latest digital data element;

means, responsive to the contents of the input register and alternately to the first and second address registers, for generating the address of the next carrier-wave segment to be read; and means for loading the generated address alternately into the second and first register after the last sample of the previous segment addressed thereby is read;

the phase-modulated carrier wave being generated at the output of the low-pass filter as the successive samples are applied to the digital-to-analog converter from the memory.

21. Apparatus of claim 20 wherein the digitally encoded samples of each wave segment are scaled according to an envelope function to facilitate blending overlapped segments together.

22. Apparatus according to claim 21 which further comprises:

a complement circuit connected between the memory and the digital-to-analog converter, the complement circuit being enabled or disabled during the reading of a given sample from the memory, according to a portion of the address in the address register selecting the given sample.

23. Apparatus according to claim 22 wherein the complement circuit comprises means for forming the 1's complement of the output of the memory.

24. Apparatus according to claim 22 wherein the complement circuit comprises means for forming the 2's complement of the output of the memory.

25. Apparatus for synthesizing a phase-modulated carrier wave according to digital data elements sequentially applied thereto, comprising:

a memory for storing a plurality of carrier-wave segments, each segment having a unique phase and being represented by a set of a plurality of digitally encoded samples;

means for selecting, according to the current data element and the phase of the last selected carrier-wave segment, the next carrier-wave segment to be read from memory;

means for addressing the memory to alternately read digital samples representing the last selected carrier-wave segment and digital samples representing the next carrier-wave segment to produce a serial output of the two overlapping carrier-wave segments, the digital samples of each of the carrier-wave segments being interleaved with the digital samples of the other; and means connected to the output of the memory for combining successive digital samples of the serial output on a sample-by-sample basis to generate the phase-modulated carrier-wave.

26. Apparatus according to claim 25 wherein the means for combining the successive digital samples includes a digital-to-analog converter connected to the output of the memory and a lowpass filter connected to the output of the digital converter for attenuating wave components having frequencies at or greater than the rate at which the samples are applied to the digital-to-analog converter.

27. Apparatus according to claim 25 wherein the selecting means comprises:

an input register for storing the latest digital data element;

at least one address register for storing the address of a selected carrier-wave segment; and means, responsive to the contents of the input register and the address register, for generating the address of a carrier-wave segment to be read, and for loading the generated address into the address register after the last sample of the preceding segment addressed thereby is read.

28. Apparatus according to claim 25 wherein the means for combining the successive digital samples includes an intermediate register;

an adder having a first input connected to the output of the memory; and a second input connected to the output of the intermediate register;

an output register; and means for alternately
  a loading the digital samples of one of the overlapping segments from the memory into the intermediate register and
  b loading the digital samples of the other of the overlapping segments from the memory simultaneously with the previously read digital samples from the intermediate register into the output register via the adder;

a digital-to-analog converter connected to the output of the output register for converting the contents of the output register to the phase-modulated carrier.

* * * * *